United States Patent Office 3,489,801
Patented Jan. 13, 1970

3,489,801
N - MONO - HYDROXYALKYLATED TERTIARY AMINOBENZENE COMPOUNDS AND PROCESS FOR THE PREPARATION THEREOF
Oskar Süs and Georg Werner, Wiesbaden-Biebrich, and Heinz Schafer, Wiesbaden-Sonnenberg, Germany, assignors to Kalle Aktiengesellschaft, Wiesbaden-Biebrich, Germany, a corporation of Germany
No Drawing. Filed May 5, 1966, Ser. No. 553,600
Claims priority, application Germany, May 8, 1965,
K 56,059
Int. Cl. C07c 93/06, 91/30, 87/28
U.S. Cl. 260—570.5                                  4 Claims

ABSTRACT OF THE DISCLOSURE

This invention relates to a process for the preparation of N-mono-hydroxyalkylated tertiary aminobenzene compounds, and to the compounds so produced, in which process certain secondary aminobenzenes are reacted in a quantity of a lower aliphatic alcohol which is sufficient for solution thereof and at a temperature of at least 90° C., with more than an equimolecular quantity of an alkylene oxide having from 2 to 4 carbon atoms.

---

Hydroxyalkylated amines have gained considerable technical importance in the preparation of azo dyestuffs. In dyestuff chemistry, these bases are coupled with suitable diazo compounds and the azo dyes thus produced are used, in dispersion, mainly for dyeing synthetic fibers, e.g. of acetate rayon. The hydroxyl group present in the hydroxyalkyl residue improves the absorption of the dyestuff by the fiber.

For the preparation of N-mono-hydroxyalkylated aminobenzene compounds with a tertiary amino group, the following procedure has normally been used; in a first reaction, aniline or a nuclear substitution product thereof is mono-hydroxyalkylated by the action of ethylene chlorohydrin or an alkylene oxide, to yield a secondary base, and the second hydrocarbon residue, which may be substituted or unsubstituted, is then introduced by the action of alkyl halides, alkyl sulfates, or aralkyl halides, on the secondary base.

However, during the hydroxyalkylation of the primary aminobenzene compounds, there are produced considerable quantities of aminobenzenes which are twice hydroxyalkylated at the amino nitrogen and which can be separated from the desired secondary amino benzenes only with difficulty. Therefore, it has proved advantageous to introduce first the hydrocarbon residue, without hydroxyl groups, in the primary aminobenzene, and then, as the second step, convert the secondary bases thus obtained into tertiary compounds by introducing a hydroxyalkyl residue into the amino group.

This conversion into the tertiary compounds can be fairly easily effected by starting from secondary alkyl anilines, which are substituted in the amino group by lower alkyl groups and which, moreover, contain no substituent in the o-position to the amino group in the nucleus. However, if it is intended to introduce hydroxyalkyl groups into secondary aminobenzene compounds having a "bulky" residue attached to the nitrogen atom, e.g. a hydrocarbon residue, such as an aryl or aralkyl residue, or an alkyl group carrying another aromatic ring, hydroxyalkylation becomes more difficult. This is particularly the case when the benzene ring contains an additional substituent in the o-position to the amino group. In many cases, it is then quite impossible to introduce the hydroxyalkyl group into the amino group, irrespective of whether hydroxyalkylation is to be effected by the action of alkylene chlorohydrin or alkylene oxides. The action of the hydroxyalkylating agent is impeded by steric factors.

The present invention provides a process which eliminates the aforementioned difficulties in the reaction of alkylene oxides with secondary aminobenzene compounds. In the process for the preparation of N-amino-hydroxyalkylated tertiary aminobenzene compounds, a secondary aminobenzene of the following general formula

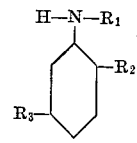

wherein $R_1$ is an aryl residue, aralkyl residue, aryloxyalkyl residue, aryl thioalkyl residue or cycloalkyl residue, in which the ring present also may be substituted, $R_2$ is hydrogen, an alkyl residue, an alkyl or aryl residue attached to the benzene ring via an oxygen or sulfur atom, or a β-hydroxyethoxy residue, and $R_3$ is hydrogen or halogen atom or a lower alkyl or alkoxy residue, is reacted, in such a quantity of a lower aliphatic alcohol which is sufficient for solution thereof and at a temperature of at least 90° C., with more than an equimolecular quantity of an alkylene oxide having from 2 to 4 carbon atoms, if desired with an additional increase of pressure caused by an inert gas in the reaction vessel.

The compounds produced by the process of the present invention are tertiary N-mono-hydroxyalkyl aminobenzenes of the following formula:

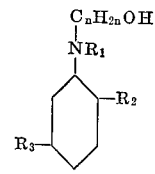

wherein $R_1$, $R_2$ and $R_3$ have the meaning given above, and $n$ is the number 2, 3, or 4.

In the hydroxyalkylation process of the invention, an excess of alkylene oxide is used for the reaction. In order to effect as complete as possible a conversion of the secondary bases used as starting material into the tertiary compounds, the excess quantity used should be at least one mole of alkylene oxide per mole of base used, so that, per mole of secondary base, at least 2 moles of the alkylene oxide used are present in the reaction vessel. Even larger quantities of alkylene oxide have an advantageous effect on the course of the reaction. The excess quantity used may vary within wide limits, depending on the secondary aminobenzene used as the reaction component.

Due to the nature of the alkylene oxides, the reaction is performed in a pressure vessel. Gauge pressures of from 5 to 15 kg./cm.² have proved to be very advantageous for the course of the reaction. It may be advisable to create an initial gauge pressure of a few atomspheres, e.g. 5 kg./cm.², in the beginning of the reaction, by introducing an inert gas, e.g. nitrogen, into the reaction vessel. The quantity of alkylene oxide used in excess may depend on the pressure prevailing in the vessel.

The hydroxyalkyl residue does not enter the secondary amino group at once, but requires a prolonged action of the alkylene oxide at an elevated temperature. For a reaction which may be of interest for practical purposes as regards the reaction time, the reaction mixture must be heated to a temperature of at least 90° C. Advantageously, the reaction is performed at a temperature in the range from 100 to 130° C. The application of temperatures above 140° C. is less advantageous because the polymerization tendency of the alkylene oxides increases at higher temperatures.

By the process of the present invention, tertiary aminobenzenes are easily obtained in which the amino group is substituted by a hydroxyalkyl residue with 2 to 4 C-atoms, the reaction proceeding smoothly and producing unprecedented, unexpectedly high yields, sometimes almost 100%. Such compounds are of great practical importance for technical processes which are based on the formation or application of synthetic organic dyestuffs.

The practically complete replacement of the hydrogen atom attached to the nitrogen in the secondary amino group by hydroxyalkyl, caused by reaction of the amine with an alkylene oxide having from 2 to 4 carbon atoms, was unexpected. The reactivity of alkylene oxides, e.g. ethylene oxide, towards compounds having hydroxyl groups, is well known in the art. It was, therefore, very surprising that in the process of the invention and under the reaction conditions stated, the alkylene oxide should be available for replacing the hydrogen atom at the nitrogen of the secondary amino group, and not, as could be expected, intercepted by the formation of ethers with the alcohols present in the reaction mixture.

The singularity of the process according to the present invention is clearly established by the following facts: If alkylene oxide is allowed to react on the secondary aminobenzene compound as in the process according to the present invention, with the exception that the reaction takes place in the presence of an inert solvent, e.g. benzene, halogenated benzene, dioxane, dimethyl sulfoxide, dimethyl formamide, or acetone, instead of an aliphatic alcohol, practically no conversion into the tertiary N-hydroxyalkyl aminobenzene occurs, although such conversion seemed more likely with the application of an inert solvent than with the application of a solvent containing hydroxyl groups. If alkylene oxide is caused to react on the secondary aminobenzene compound as described in the process of the invention, omitting, however, the aliphatic alcohol, practically no tertiary N-hydroxy-alkyl aminobenzene compound is formed.

This fact is deserving of particular notice because in the case of N-monoalkyl aminobenzenes, e.g. N-monomethyl aniline, the corresponding tertiary N - hydroxyethyl - N - alkylaminobenzenes are particularly easily obtained by hydroxyethylation with ethylene oxide if no solvent is used.

The singularity of the process of the present invention is also clearly shown by the fact that reaction takes place only when an alkylene oxide is used as the hydroxyalkylation agent. If, instead of ethylene oxide, there is used, e.g. ethylene chlorodydrin, which is well known as an equivalent hydroxyethylation agent and widely used in practice for this purpose, and the same conditions of reaction are employed, either no hydroxyalkylation occurs at all, or the yield is so poor that it is of no interest for commercial purposes.

Some of the secondary aminobenzene compounds of the above general formula which may be used as reaction components in the process of the present invention already have been described in the literature. As far as they have not been described, they are easily obtained by known methods. For example, the secondary N-phenoxy-ethylated aminobenzenes are generally available by the methods described in German Patent No. 929,590, by the reaction of aniline or a corresponding primary aniline derivative, with phenoxyalkyl bromides or the tosyl esters of phenoxyalkyl alcohols.

The process of the invention will be further described with reference to the following examples. The formulae of the compounds prepared in accordance with these examples are given at the end of the specification. All the reactions described in the examples were performed in accordance with the invention, i.e. in the presence of a lower aliphatic alcohol. In addition thereto, and as a deviation from the invention, the reactions were also performed without the addition of solvents or with the application of an inert solvent instead of alcohol. Without exception, the examples prove the above statements regarding the unexpected and excellent specific effect of the lower aliphatic alcohols on the reaction between the secondary aminobenzene compounds and alkylene oxide, which effect could not be observed when either an inert solvent or no solvent at all was used.

EXAMPLE 1

1 - N - ($\beta$ - hydroxyethyl - $\beta$ - phenoxyethyl) - amino-2-methoxy-5-chlorobenzene, corresponding to Formula 1, is prepared as follows:

The secondary base used as the starting material is 1-N-($\beta$-phenoxyethyl)-amino-2-methoxy - 5 - chlorobenzene, which is prepared as follows: 314 g. (2 moles) of 4-chloro-2-amino-anisol are suspended in 100 ml. of water to which 1 g. of diisobutyl-naphthalene-sulfonic acid sodium salt has been added. The mixture is heated to boiling while agitating. 241 g. (1.2 mole) of $\beta$-bromo-ethyl-phenyl-ether, in three equal portions, are cautiously added, drop by drop, in such a manner that 1½ hours are required for each portion to be added. After adding one portion, the reaction mixture is heated for 3 hours, and after adding the entire quantity of bromo-ethyl-phenyl-ether, heating is continued for a further 15 hours. The hot mass contained in the flask is poured into 800 ml. of 50% acetic acid which causes the main portion of the excess base used as the starting material to remain in solution, while the reaction product, 1 - N - ($\beta$ - phenoxyethyl)-amino-2-methoxy-5-chlorobenzene separates as an oily product. When it is slowly cooled, with stirring, the oil becomes crystalline. The crystal slurry is drawn off, and the crystals melt at 83° C. after recrystallization from methanol. The yield is 226 g.=81.5 percent of the theoretical quantity.

The 4-chloro-2-amino-anisol used in excess may be recovered from the acetic acid solution by the addition of alkali.

70 g. (¼ mole) of 1-N-($\beta$-phenoxyethyl) - amino - 2-methoxy-5-chlorobenzene are heated for 6 hours at 100° C. with 350 ml. of methanol and 125 ml. of ethylene oxide (approximately 10 moles) in an autoclave provided with a stirrer and having a capacity of 1 liter. The pressure, which initially had been adjusted to 5 kg./cm.$^2$ by the introducing of nitrogen into the vessel, rises to 15 kg./cm.$^2$ during this time. The solvent is then evaporated and the residue distilled in vacuo. Boiling point, at 2–2.5 mm. pressure, is 217–218° C. Yield: 77 g.=94 percent of the theoretical quantity.

The compounds corresponding to Formulae 2, 3, 4, 6, 7, 8, and 9 are prepared analogously from the secondary bases listed in the following table:

| Compound | Secondary base used as starting material | Melting point of sec. base (° C.) |
|---|---|---|
| Formula 2 | 1-N-(4'-chlorophenoxyethyl)-amino-2-methoxy-5-chlorobenzene. | 106–107 |
| Formula 3 | 1-N-($\gamma$-phenoxypropyl)-amino-2-methoxy-5-chlorobenzene. | 61–62 |
| Formula 4 | 1-N-($\beta$-napthoxyethyl)-amino-2-methoxy-5-chlorobenzene. | 117–118 |
| Formula 6 | 1-N-($\beta$-phenoxyethyl)-amino-2-ethoxy-5-chlorobenzene. | 59–60<br>¹ 178–180 |
| Formula 7 | 1-N-($\beta$-phenoxyethyl)-amino-2-$\beta$-hydroxyethoxy-5-chlorobenzene. | 134–135 |
| Formula 8 | 1-N-($\beta$-phenoxyethyl)-amino-2-methoxy-benzene. | 48–50 |
| Formula 9 | 1-N-($\beta$-phenoxyethyl)-amino-2,5-diethyoxybenzene. | 65–66 |

¹ Boiling pt. (2 mm.).

EXAMPLE 2

1-N-($\beta$-hydroxyethyl-$\beta$ - phenylthioethyl) - amino - 2-methoxy-5-chlorobenzene, corresponding to Formula 5, is prepared as follows:

The secondary aminobenzene compound used as the starting material is 1 - N - (β-phenylthioethyl)-amino-2-methoxy-5-chlorobenzene which is prepared as follows:

80 g. (0.5 mole) of 4-chloro-2-aminoanisol are suspended in 60 ml. of water to which 0.3 g. of diisobutylnaphthalene sulfonic acid sodium salt has been added. The mixture is heated to the boiling point in a flask while stirring. 55 g. (0.25 mole) of β-bromo-ethyl-thiophenyl-ether are then added dropwise over a period of 2 hours. After all the β - bromo - ethyl-thiophenylether has been added, heating is continued for 15 hours with stirring. The hot mass contained in the flask is poured into 500 ml. of 50% acetic acid, so that the main portion of the excess base used as starting material remains dissolved.

The 1 - N - (β - phenylthioethyl)-amino-2-methoxy-5-chlorobenzene is obtained first as an oily substance which solidifies and becomes crystalline when it cools. The crystal slurry is drawn off by suction, and crystals are obtained which have a melting point of 59–60° C. after they have been recrystallized from ethanol for purification. The yield is 55.5 g.=65 percent of the theoretical quantity.

35 g. of 1 - N - (β - phenylthioethyl)-amino-2-methoxy-5-chlorobenzene are heated with 175 ml. of methanol and 62 ml. of ethylene oxide (approximately 10 moles) for 4 hours to 100° C. in a half-liter autoclave provided with a stirrer. The pressure in the vessel, which initially had been adjusted to 5 kg./cm.$^2$ by the introduction of nitrogen, rises to 10 kg./cm.$^2$ during this time. The solvent is then evaporated and the residue distilled in vacuo. Boiling point, at 1.5 mm. pressure is 223–224° C. Yield: 33 g.=82.5 percent of the theoretical quantity.

EXAMPLE 3

For the preparation of 1 - N - (hydroxethyl-benzyl)-amino-2,5-diethoxy-benzene, corresponding to Formula 16, amino - hydroquinone - diethylether is benzylated in known manner to yield 1 - N - benzylamino - 2,5-diethoxy-benzene (melting point 47–48° C.; boiling point, at 0.8 mm. pressure, 203–208° C.).

27.1 g. (⅒ mole) of 1 - N - benzylamino-2,5-diethoxybenzene are dissolved in 150 ml. of ethanol and then heated with 50 ml. of ethylene oxide for 4 hours to 100° C. in a half-liter rocking autoclave. After the first runnings have been drawn off, the reaction product has a boiling point, at 0.8 mm. pressure, of 204–207° C., remains oily, and consists of 99 percent of the tertiary base. The yield is about 90 percent of the theoretical quantity.

Equally good results are obtained when the ethanol used in the above reaction mixture is replaced by methanol, n-propanol, isopropanol, n-butanol, methylglycol, or ethyleneglycol. The yields are practically identical to those stated above. The boiling points of the various tertiary reaction products obtained differ slightly.

In the manner described above, 1 - N - (hydroxyethyl-benzyl) - amino - 2,5-diethoxy-benzene may be produced on a large scale. Quantities up to 5 kg. were processed.

EXAMPLE 4

1 - N - (hydroxyethyl - benzyl)-amino-2-hydroxyethoxy-5-chlorobenzene, corresponding to Formula 11, is prepared by dissolving 55.4 g. (⅕ mole) of 4-chloro-2-benzylamino phenyl - β - hydroxy-ethey-ether (melting point 128–130° C.) in 400 ml. of methanol and heating the solution with 100 ml. of ethylene oxide for 4 hours to 100° C. in an autoclave provided with a stirrer and having a capacity of one liter. When processing the contents of the autoclave, 60.9 g. of 1 - N - (hydroxyethyl-benzyl) - amino - 2 - hydroxy - ethoxy-5-chlorobenzene are obtained, which corresponds to a yield of 95 percent of the theoretical quantity. Boiling point, at 0.8 mm. pressure: 243–246° C. Analysis shows that the reaction product consists of 100 percent of the tertiary base.

EXAMPLE 5

1 - N - (hydroxyethyl - benzyl) - amino-2,5-dimethoxybenzene, corresponding to Formula 12, is prepared by dissolving 24.3 g. (⅒ mole) of 1-benzylamino-2,5-dimethoxy-benzene (boiling point, at 0.8 mm. pressure, 197–202° C.) in 140 ml. of methanol and heating the solution with 50 ml. of ethylene oxide for 4 hours to 100° C. in a half-liter rocking autoclave. By processing the contents of the autoclave, 26.2 g. of an oily reaction product are obtained which has a boiling point, at 0.8 mm. pressure, of 205–208° C. and, according to analysis, still contains 3.6 percent of the secondary base used as the starting material.

EXAMPLE 6

1 - N - (hydroxyethyl - benzyl)-amino-2-methoxy-5-chlorobenzene, corresponding to Formula 13, is prepared by dissolving 49.4 g. (⅖ mole) of 4-chloro-2-benzylanisidine-1 (melting point 109–110° C.) in 500 ml. of ethanol and heating the solution with 100 ml. of ethylene oxide for 4 hours to 100° C. in an autoclave provided with stirrer and having a capacity of one liter. When the contents of the autoclave are processed, 50 g. of an oil having a boiling point, at 0.8 mm. pressure, of 208–212° C., are obtained. This product contains 1-N-(hydroxyethyl-benzyl) - amino - 2-methoxy-5-chlorobenzene, besides the secondary base used as the starting material.

EXAMPLE 7

1 - N - (hydroxyethyl - benzyl)-amino-2-ethoxy-benzene, corresponding to Formula 14, is prepared by dissolving 22.7 g. (⅒ mole) of 2-benzylphenetidine (melting point 29.5–30.5° C.; boiling point, at 0.9 mm. pressure, 175–180° C.) in 140 ml. of methanol and reacting it with 50 ml. of ethylene oxide by heating it for 4 hours to 100° C. in a half-liter rocking autoclave. The yield of pure, distilled, 100% tertiary base (boiling point, at 0.8 mm. pressure, 181–184° C.) is 22.5 g., which corresponds to 83 percent of the theoretical quantity.

EXAMPLE 8

1 - N - (hydroxyethyl-cyclohexyl)-aminobenzene, corresponding to Formula 15, is prepared by dissolving 17.5 g. (⅒ mole) of 1 - cyclohexyl - aminobenzene (boiling point, at 0.75 mm. pressure, 118–122° C.) in 150 ml. of methanol and heating the solution with 50 ml. of ethylene oxide for 4 hours to 100° C. in a rocking autoclave. When processing the contents of the autoclave, 16.3 g. of 1-N-(hydroxyethyl-cyclohexyl)-aminobenzene (melting point 64–67° C.; boiling point, at 0.8 mm. pressure, 173–175° C.) are obtained. Instead of the methanol used in this example, another lower alcohol also may be used with equally good results.

EXAMPLE 9

1 - N - (β - hydroxypropyl - benzyl) - amino - 2 - ethoxy-benzene, corresponding to Formula 17, is prepared by dissolving 22.7 g. (⅒ mole) of benzyl-2-phenetidine (melting point 30–31° C.; boiling point, at 1 mm. pressure, 196–198° C.) in 150 ml. of methanol and heating the solution with 66 ml. of propylene oxide for 4 hours to 100° C. in a half-liter rocking autoclave. When processing the contents of the autoclave, 26.9 g. of 1-N-(β-hydroxypropyl - benzyl) - amino-2-ethoxy-benzene (boiling point, at 0.7 mm. pressure, 174–176° C.) corresponding to 94.4 percent of the theoretical quantity, are obtained. An analysis of the reaction product shows that the content of tertiary base is practically 100 percent.

EXAMPLE 10

1 - N - (β - hydroxypropyl - benzyl) - amino - 2 - methoxy-5-chlorobenzene, corresponding to Formula 18, is prepared by dissolving 24.7 g. (⅒ mole) of 4-chloro-2-benzylamino-1-anisole (melting point 109–110° C.) in 150 ml. of methanol and heating the solution with 66 ml. of propylene oxide for 5 hours at 100° C. in a half-liter rocking autoclave. When processing the contents of the autoclave, 26.6 g. of 1-N-(β-hydroxypropyl-benzyl)-amino-2-methoxy-5-chlorobenzene are obtained. The melting point of this compound, at a pressure of 0.8 mm., is 204–206° C. The yield is 87.2 percent.

EXAMPLE 11

1 - N - (β - hydroxypropyl - benzyl) - amino - 2,5 - diethoxy-benzene, corresponding to Formula 19, is prepared by dissolving 27.1 g. (1/10 mole) of 1-benzylamino-2,5-diethoxy-benzene (see Example 3) in 150 ml. of methanol. The solution is then heated with 66 ml. of propylene oxide for 5 hours at 110° C. in a half-liter rocking autoclave. The contents of the pressure vessel are then subjected to distillation under reduced pressure.

At a pressure of 0.8 mm., the hydroxypropylation product evaporates at 207–209° C. The tertiary base melts at 55–58° C. The yield is 30.4 g., which corresponds to 92.4 percent of the theoretical quantity. An analysis of the reaction product shows that it contains approximately 100 percent of the tertiary base.

EXAMPLE 12

1 - N - (hydroxyethyl - benzyl) - amino - 2 - phenoxy-benzene, corresponding to Formula 20, is prepared by dissolving 27.5 g. (1/10 mole) of 2-benzylamino-diphenylether (melting point 43.5–45° C.; boiling point, at a pressure of 0.8 mm., 144–147° C.) in 150 ml. of methanol and heating the solution with 50 ml. of ethylene oxide for 4 hours at 100° C. in a half-liter autoclave.

When processing the contents of the autoclave, 31.8 g. of 1 - N-(hydroxyethyl-benzyl)-amino-2-phenoxy-benzene having a boiling point of 208–212° C. (at a pressure of 0.7 mm.) are obtained, which corresponds to a quantitative yield. An analysis of the reaction product shows that it consists of 100 percent of tertiary base.

If no methanol or other lower aliphatic alcohol is used, no hydroxy-ethylation can be effected. If dimethyl sulfoxide or dimethyl formamide is used as the solvent, the hydroxy-ethylation produces a very poor yield of tertiary base, so that this method is unsuitable for large scale production.

EXAMPLE 13

1 - N - (hydroxyethyl - benzyl) - amino - 2 - methoxy-5-methylbenzene, corresponding to Formula 21, is prepared by dissolving 22.7 g. (1/10 mole) of 2-methoxy-5-methyl-N-benzylaniline (melting point 105–110° C.) in 150 ml. of methanol and reacting it with 50 ml. of ethylene oxide in the manner described in the preceding examples. When processing the contents of the autoclave, 25.9 g. of 1-N-(hydroxyethyl-benzyl)-amino-2-methoxy-5-methyl-benzene are obtained, corresponding to a yield of 95.6 percent of the theoretical quantity. Boiling point, at 0.7 mm. pressure, is 182–183° C.

Analogously, 1 - N-(hydroxyethyl-benzyl)-amino-2-(4'-methyl-thiophenoxy)-benzene, corresponding to Formula 22, (boiling point, at 0.75 mm. pressure, 226–229° C.) is prepared from 1-benzylamino-2- (4'-methyl-thiophenoxy)-benzene (boiling point, at 0.7 mm. pressure, 217–220° C.).

EXAMPLE 14

1 - N - (hydroxyethyl - 4' - methoxybenzyl) - amino - 2-ethoxybenzene, corresponding to Formula 23, is prepared by dissolving 24.5 g. of 4'-methoxy-benzyl-2-phenetidine (boiling point, at a pressure of 0.7 mm., 205–207° C.) in 150 ml. of methanol and reacting the solution with 50 ml. of ethylene oxide in the manner described in the preceding examples. 27.2 g. of 1-N-(hydroxyethyl-4'-methoxybenzyl)-amino-2-ethoxy-benzene are obtained, corresponding to 94.8 percent of the theoretical quantity. At a pressure of 0.8 mm., the compound boils at 212–217° C. An analysis of the reaction product shows that it consists of 100 percent of the tertiary base.

EXAMPLE 15

1 - N - (hydroxyethyl - cyclohexyl) - amino - 2 - methyl-benzene, corresponding to Formula 24, is prepared by dissolving 18.8 g. (1/10 mole) of 1-cyclohexylamino-2-methyl-benzene (boiling point, at 0.9 mm. pressure, 147–150° C.) in 150 ml. of methanol. The solution is then heated with 50 ml. of ethylene oxide for 4 hours to 100° C. in an autoclave while stirring.

Instead of using liquid ethylene oxide, gaseous ethylene oxide may be introduced into the evacuated autoclave until the pressure of the ethylene oxide remains constant.

1 - N - (hydroxyethyl - cyclohexyl) - amino - 2 - methyl-benzene is obtained in a yield of 90.5 percent. An analysis of the reaction product shows that it contains 100 percent of tertiary base. At a pressure of 0.8 mm., the base boils at 159–162° C.

EXAMPLE 16

1 - N - (hydroxyethyl - 2' - chlorobenzyl) - amino - 2-methoxy-benzene, corresponding to Formula 25, is prepared by reacting 24.8 g. (1/10 mole) of 1-(2'-chlorobenzyl)-amino-2-methoxy-benzene (melting point 54–56° C., boiling point, at 0.9 mm. pressure, 196–204° C.) in 150 ml. of methanol with 50 ml. of ethylene oxide for 4 hours at 100° C. in an autoclave. When processing the contents of the autoclave, 27.7 g. of 1-N-(hydroxyethyl-2'-chlorobenzyl)-amino-2-methoxy-benzene (boiling point, at 0.8 mm. pressure, 197–201° C.) are obtained corresponding to 95 percent of the theoretical quantity. According to analysis, the reaction product consists of approximately 100 percent of a base with at tertiary nitrogen.

EXAMPLE 17

N-(hydroxyethyl-benzyl)-aminobenzene is prepared by heating N-benzylaniline with excess ethylene oxide, in an autoclave for 4 hours to 100° C. in the presence of a lower aliphatic alcohol, e.g. methyl, ethyl, propyl or butyl alcohol. Quantitative hydroxyethylation occurs, and an excellent yield of N-hydroxyethyl-N-benzylaniline corresponding to Formula 10 is obtained.

EXAMPLE 18

1 - N - (hydroxyethyl - benzyl) - amino - 2 - methoxy-5-bromobenzene, corresponding to Formula 26, is prepared by dissolving 43.8 g. (3/20 mole) of 4-bromo-2-benzyl-anisidine-1 (melting point 117.5–119° C.) in 200 ml. of methanol and heating the solution with 75 ml. of ethylene oxide for 5 hours to 105° C. in a half-liter rocking autoclave, in which a pressure of 5 kg./cm.² had been created by the introduction of nitrogen. When processing the contents of the autoclave, 47.8 g. of 1-N-(hydroxyethyl-benzyl)-amino-2-methoxy-5-bromobenzene are obtained, corresponding to a yield of 94.8 percent.

According to analysis, the reaction product consists of 100 percent of the tertiary base. The boiling point, at 0.75 mm. pressure, is 209–211° C.

EXAMPLE 19

1 - N - (hydroxybutyl - benzyl) - amino - 2,5 - dimethoxybenzene, corresponding to Formula 27, is prepared by heating 24.3 g. (1/10 mole) of 1-benzylamino-2,5-dimethoxy-benzene (see Example 5) with 150 ml. of methanol and 88 ml. of butylene oxide for 7 hours to 115° C. in a rocking autoclave. When processing the reaction mixture, 29.7 g.=94.3 percent of 1-N-(hydroxybutyl-benzyl)-amino-2,5-dimethoxy-benzene are obtained. An analysis of the reaction mixture shows that it contains 0% of secondary and 99.1% of tertiary base. The tertiary hydroxy butylation product has a boiling point of 209–213° C., at a pressure of 0.85 mm.

Analogously to the method described above, 1-N-(hydroxybutyl - benzyl) - amino - 2,5 - diethoxy - benzene, corresponding to Formula 28, (boiling point at 0.9 mm. pressure, 206–209° C.) is obtained in a yield of 95.7%, using 1-benzylamino-2,5-diethoxy-benzene (melting point and boiling point as stated in Example 3) as the secondary base. Analysis of the reaction product shows that it consists of approximately 100% of tertiary base.

EXAMPLE 20

For the preparation of 1-N-(hydroxybutyl-2'-chlorobenzyl)-amino-2-methoxy-benzene, corresponding to Formula 29, 2'-chloro-benzyl-2-anisidine-1,1,2'-chlorobenzyl-amino-2-methoxy-benzene (see Example 16) is hydroxy-butylated at the nitrogen atom as follows: 24.8 g. (1/10 mole) of the secondary base used as the starting material (melting point 54–56° C.) in 150 ml. of methanol are heated with 88 ml. of butylene oxide for 5 hours to 115° C. in an autoclave, applying an additional nitrogen pressure of 5 kg./cm.² After the first runnings have been distilled off, 30.2 g. are obtained of the tertiary base hydroxy-butylated at the amino nitrogen, which corresponds to a yield of 94.6%. The tertiary hydroxy-butylation product has a boiling point of 193–196° C., at 0.8 mm. pressure. An analysis of the reaction product shows that it consists of approximately 100% of a base with a tertiary nitrogen atom.

The formulae of the compounds referred to above are as follows:

Formula 1

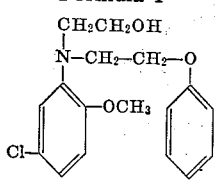

Formula 2

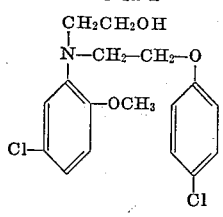

Formula 3

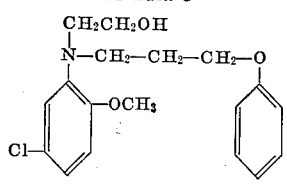

Formula 4

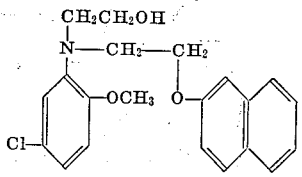

Formula 5

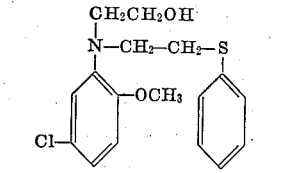

Formula 6

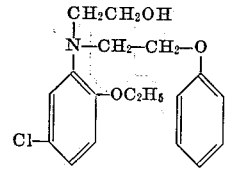

Formula 7

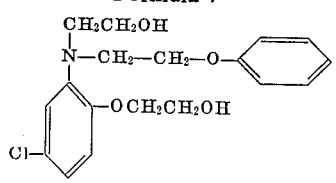

Formula 8

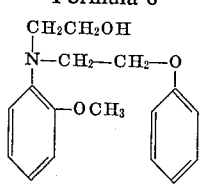

Formula 9

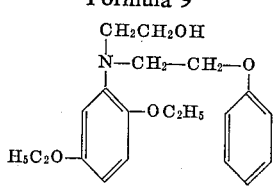

Formula 10

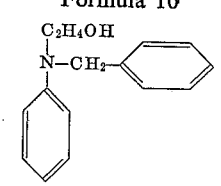

Formula 11

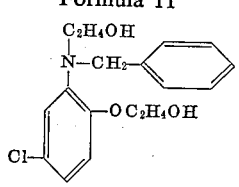

Formula 12

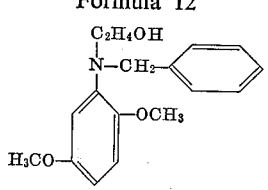

Formula 13

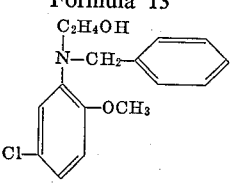

Formula 14

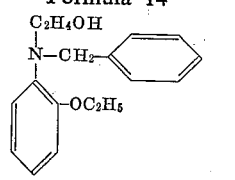

Formula 15

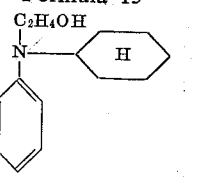

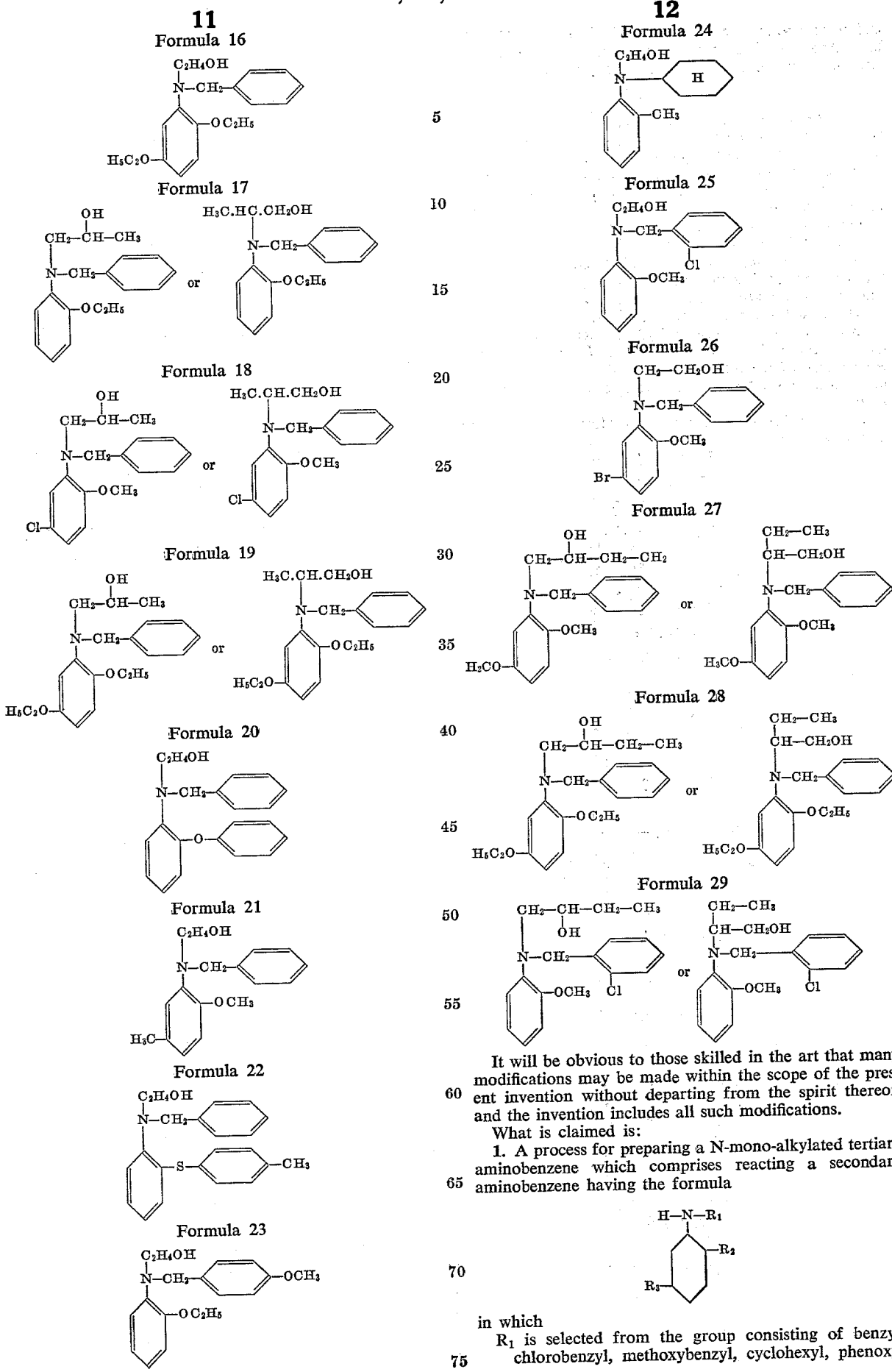

It will be obvious to those skilled in the art that many modifications may be made within the scope of the present invention without departing from the spirit thereof, and the invention includes all such modifications.

What is claimed is:
1. A process for preparing a N-mono-alkylated tertiary aminobenzene which comprises reacting a secondary aminobenzene having the formula

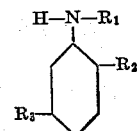

in which
R₁ is selected from the group consisting of benzyl, chlorobenzyl, methoxybenzyl, cyclohexyl, phenoxyethyl, phenoxypropyl, naphthoxyethyl, chlorophenoxyethyl, or phenylthioethyl; $R_2$ is selected from the group consisting of hydrogen, methyl, ethyl, methoxy, ethoxy, hydroxy-ethoxy, phenoxy, or tolylmercapto, and $R_3$ is selected from the group consisting of hydrogen, chloro, bromo, methyl, methoxy, or ethoxy;
in a sufficient quantity of a lower aliphatic alcohol to dissolve the secondary aminobenzene and at a temperature of 90 to 140° C., with more than an equimolecular quantity of an alkylene oxide having 2 to 4 carbon atoms.

2. A process according to claim 1 in which the reaction is conducted under superatmospheric pressure.

3. A process according to claim 1 in which the reaction is conducted under a gauge pressure in the range of 5 to 15 kg./cm.²

4. A process according to claim 1 in which the alkylene oxide is present in at least twice the equimolecular quantity.

References Cited

UNITED STATES PATENTS

| | | | |
|---|---|---|---|
| 2,573,606 | 10/1951 | Rieveschl et al. | 260—570.9 |
| 2,597,247 | 5/1952 | Kerwin et al. | 260—570.9 |
| 2,599,001 | 6/1952 | Kerwin et al. | 260—570.7 |
| 2,683,719 | 7/1954 | Kerwin et al. | 260—570.7 X |
| 2,887,477 | 5/1959 | Straley et al. | 260—149 |
| 3,154,534 | 10/1964 | Gale et al. | 260—573 X |
| 3,154,535 | 10/1964 | Graham et al. | 260—573 X |
| 3,337,525 | 8/1967 | Peters et al. | 260—573 X |
| 3,294,541 | 12/1966 | Werner et al. | 260—142 X |

ROBERT V. HINES, Primary Examiner

U.S. Cl. X.R.

8—41; 260—206, 570.7, 570.9, 573, 575, 577, 609, 612